(12) United States Patent
Klinect et al.

(10) Patent No.: US 9,844,808 B2
(45) Date of Patent: Dec. 19, 2017

(54) CRIMPER

(71) Applicant: FAMOUS INDUSTRIES, INC., Mount Vernon, OH (US)

(72) Inventors: Charles Klinect, Cambridge, OH (US); Matthew Lehotay, Cambridge, OH (US)

(73) Assignee: FAMOUS INDUSTRIES, INC., Mount Vernon, OH (US)

( * ) Notice: Subject to any disclaimer, the term of this patent is extended or adjusted under 35 U.S.C. 154(b) by 358 days.

(21) Appl. No.: 14/776,926

(22) PCT Filed: Mar. 17, 2014

(86) PCT No.: PCT/US2014/030443
§ 371 (c)(1),
(2) Date: Sep. 15, 2015

(87) PCT Pub. No.: WO2014/145643
PCT Pub. Date: Sep. 18, 2014

(65) Prior Publication Data
US 2016/0038988 A1      Feb. 11, 2016

Related U.S. Application Data

(60) Provisional application No. 61/792,697, filed on Mar. 15, 2013.

(51) Int. Cl.
*B21D 19/04*      (2006.01)
*B21D 39/04*      (2006.01)
(Continued)

(52) U.S. Cl.
CPC ......... *B21D 19/046* (2013.01); *B21D 39/048* (2013.01); *F24F 13/0209* (2013.01); *B21D 5/12* (2013.01); *F16L 25/08* (2013.01)

(58) Field of Classification Search
CPC . B21D 5/12; B21D 5/14; B21D 19/04; B21D 19/046; B21D 39/048;
(Continued)

(56) References Cited

U.S. PATENT DOCUMENTS

2,825,384 A * 3/1958 Goldsmith ............ B21D 49/00
                                                     138/178
3,015,293 A    1/1962 Parham
(Continued)

*Primary Examiner* — Edward Tolan
(74) *Attorney, Agent, or Firm* — Reed Smith LLP (57) ABSTRACT

A crimping machine including a first shaft having a first crimping portion and a bead wheel and a second shaft having a tapered portion disposed opposite the bead wheel of the first shaft. The first and second shafts are configured to grip a pipe blank having a transverse channel including a first angle. The first and second shafts are further configured to roll the pipe blank forward while crimping a portion of the pipe blank with the first and second crimping portions and applying pressure on the transverse channel of the pipe blank. The crimping machine further has having a tapered portion disposed opposite at least a portion of the crimping portion and the bead wheel of the first shaft. The bead wheel is configured to push upon the forming shaft to bend the first angle of the transverse channel formed in the pipe blank to a second angle.

5 Claims, 12 Drawing Sheets

(51) Int. Cl.
*F24F 13/02* (2006.01)
*B21D 5/12* (2006.01)
*F16L 25/08* (2006.01)

(58) Field of Classification Search
CPC ..... B21C 37/101; B21C 37/12; B21C 37/121; F24F 13/0209; F16L 13/14
See application file for complete search history.

(56) References Cited

U.S. PATENT DOCUMENTS

| | | | |
|---|---|---|---|
| 3,435,791 A | | 4/1969 | Wieters |
| 3,636,903 A | * | 1/1972 | Anderson ................ B21D 5/12 29/564.2 |
| 3,724,250 A | * | 4/1973 | Molino ................... B21D 5/14 72/171 |
| 3,901,174 A | * | 8/1975 | Priest .................... B21C 37/101 72/52 |
| 4,398,334 A | | 8/1983 | Kovalevich |
| 4,711,110 A | * | 12/1987 | Castricum ............... B21C 37/12 72/105 |
| 5,036,690 A | * | 8/1991 | McGowen ............ B21C 37/121 72/137 |
| 5,213,374 A | * | 5/1993 | Keating ................ F16L 21/022 228/17.5 |
| 7,478,467 B2 | * | 1/2009 | Gudenburr .......... F16L 25/0081 138/162 |
| 2011/0042945 A1 | * | 2/2011 | Coughenour ....... F24F 13/0209 285/331 |
| 2011/0258852 A1 | | 10/2011 | Bloom et al. |

\* cited by examiner

CRIMPER

CROSS-REFERENCE TO RELATED APPLICATION

This application is a United States national stage of International Application No. PCT/US2014/030443, filed Mar. 17, 2014, which published as International Publication No. WO 2014/145737, and which claims the benefit under 35 U.S.C. §119(e) of the earlier filing date of U.S. Provisional Patent Application No. 61/792,697 filed on Mar. 15, 2013, which is hereby incorporated by reference.

FIELD OF INVENTION

This application is generally directed to the field of crimpers.

BACKGROUND

Products used in heating/ventilation/air conditioning (HVAC) units are typically formed of sheet stock such as sheet metal. Examples of metals include steel, aluminum and the like. In particular, pipe or duct work for HVAC units is typically made from one or more sections of sheet stock that are formed to create a conduit. In general, duct work or conduit may have a round and/or rectangular cross section. The sections of steel conduit are joined to create the duct work. Seams are created along each pipe section where the sheet stock is joined resulting in steel against steel joint. Crimpers are typically used to crimp an end of the duct.

BRIEF DESCRIPTION OF THE DRAWINGS

Various embodiments of the invention are described herein by way of example in conjunction with the following figures, wherein like reference characters designate the same or similar elements.

DETAILED DESCRIPTION

In this respect, before explaining at least one embodiment of the invention in detail, it is to be understood that the invention is not limited in its application to the details of construction and to the arrangements of the components set forth in the following description or illustrated in the drawings and that some embodiments are described by way of reference only. The invention is capable of embodiments in addition to those described and of being practiced and carried out in various ways. Also, it is to be understood that the phraseology and terminology employed herein are for the purpose of description and should not be regarded as limiting.

Figure 1:
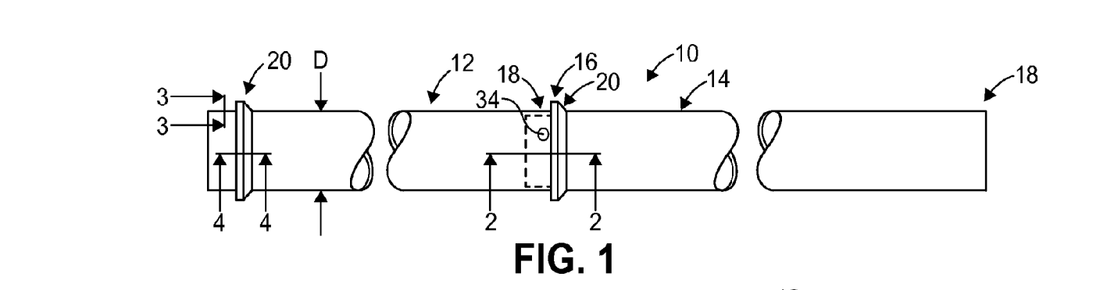
FIG. 1 is a schematic view of a portion of a duct system.

The invention will now be described with reference to the drawing figures, in which like reference numerals refer to like parts throughout. The crimper according to embodiments of the invention can be used in the formation of ducts, for example, such as the ducts illustrated in FIGS. 1-9 and disclosed in U.S. patent application Ser. No. 14/020,611, filed Sep. 6, 2013, the disclosure of which is incorporated by reference. As shown in FIG. 1, a pipe and fitting coupling system 10 includes a first pipe 12, a second pipe 14, and a joint 16. In addition to the straight pipes shown, the pipe and fitting coupling system 10 may include any suitable pipe and/or fitting known to those skilled in the art. Examples of suitable pipes and fittings include round and rectangular pipes, small and large radius elbow joints, 'Y' joints, 'T' joints, registers, and the like. Thus, for the sake of brevity, the term, "pipe 12" and "pipe 14" are used throughout the present disclosure and the figures depict a round pipe, however the embodiments are not limited to round pipes, but rather, the terms, "pipe 12" and "pipe 14" refer to round and rectangular pipe and fittings for the same.

Figure 2:
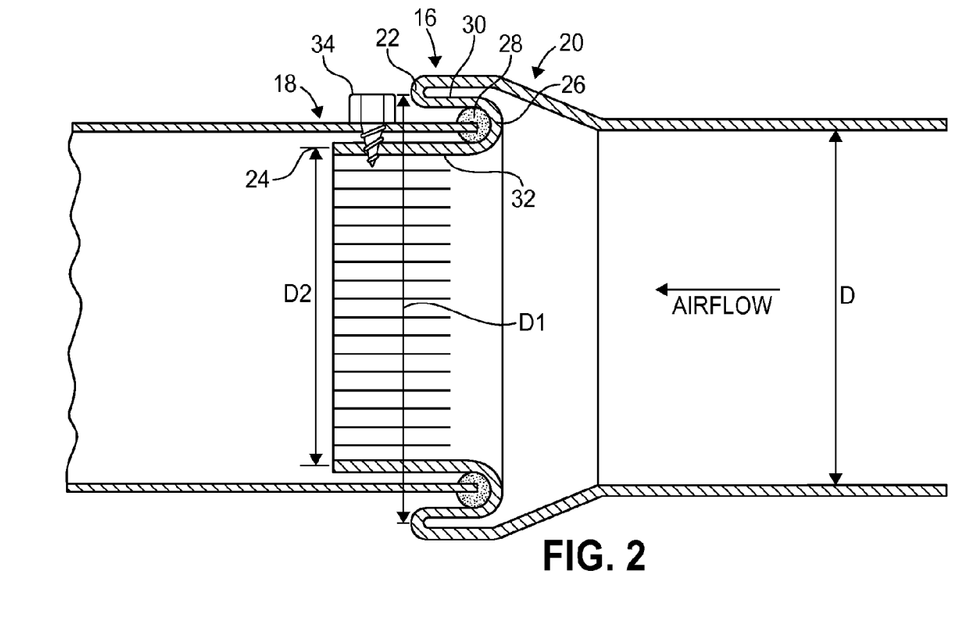
FIG. 2 is a cross-sectional view taken along line 2-2 of FIG. 1.

To continue, the first pipe 12 has a pipe diameter D and a plain end 18. The second pipe has a receiving end 20. The receiving end is a single piece of shaped sheet metal. In general, the metal may include any suitable metal. Examples of suitable metals include steel, aluminum, alloys, and the like As shown in FIG. 2, the receiving end 20 includes a first axial flange 22, a second axial flange 24, an axial groove 26, and a sealant 28. In general, the axial flanges 22 and 24 facilitate positioning the plain end 18 in the axial groove 26. The sealant 28 includes any suitable elastomeric, resilient, or otherwise malleable material that is capable of forming and maintaining a seal with the plain end 18. Particular examples of suitable materials include butyl rubber and the like. The first axial flange 22 has a first flange diameter D1 that is greater than the pipe diameter D. The second axial flange 24 has a second flange diameter D2 that is less than the pipe diameter D. The second axial flange 24 extends further axially than the first axial flange 22. As described herein, this axial extension of the second axial flange 22 facilitates securing the plain end 18 of the first pipe 12 in the receiving end 20 of the second pipe 14.

The axial groove 26 is disposed at the pipe diameter and between the first axial flange 22 and the second axial flange 24. To facilitate telescoping the plain end 18 into the receiving end, the first axial flange 22 has an inwardly angled face 30 to meet the axial groove 26 and the second axial flange 24 has an outwardly angled face 32 to meet the axial groove 26. These angled faces 30 and 32 simplify the task of aligning the two ends 18 and 20 and initiating the telescoping of the plain end 18 towards the axial groove 26. The sealant 28 is disposed in the axial groove 26 to seal the plain end 18 in the receiving end 20. The joint 16 is formed by the cooperative alignment of the plain end 18 being inserted into the receiving end 20 and being sealed by the sealant 28.

Also shown in FIGS. 1 and 2 is a fastener 34. As shown in FIG. 2, the fastener 34 is configured to pierce a wall of the plain end 18 and a wall of the second axial flange 24. In this manner, the plain end 18 may be secured in the receiving end 20.

Figure 3:
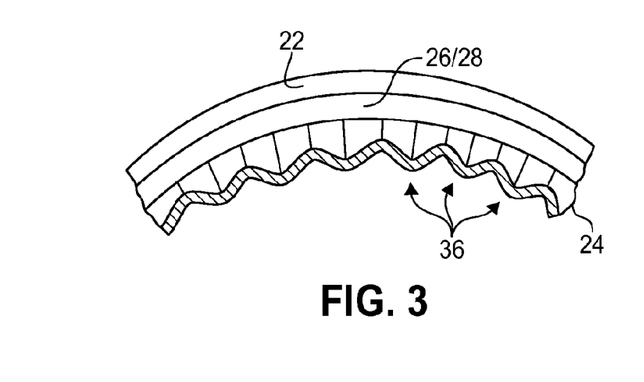
FIG. 3 is a cross-sectional view taken along line 3-3 of FIG. 1.

FIG. 3 is a cross-sectional view taken along line 3-3 of FIG. 1. As shown in FIG. 3, the second axial flange 24 includes a series of crimps 36 disposed about the circumference of the second axial flange 24. The series of crimps 36 are configured to provide a taper in the second axial flange 24. As such, the second axial flange is formed into a portion of a cone, e.g., a frusta-conical segment to facilitate telescopically sliding the plain end 18 over the second axial flange 24 and into the axial groove 26. In various embodiments, the size or width of each crimp of the series of crimps 36 is about 2 mm to about 15 mm. More particularly, each crimp is about 4 mm but could also be larger.

Figure 4:
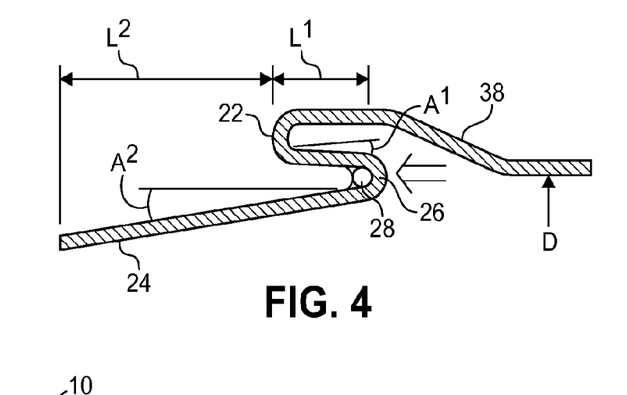
FIG. 4 is a cross-sectional view taken along line 4-4 of FIG. I.

FIG. 4 is a cross-sectional view taken along line 4-4 of FIG. 1. As shown in FIG. 4, the inwardly angled face 30 of the first axial flange 22 includes an angle $A^1$. In general, the angle $A^1$ includes any suitable angle. More particularly, the angle $A^1$ is about 1° to about 15° to facilitate telescopically sliding the plain end 18 into the axial groove 26. More particularly still, the angle $A^1$ is about 10°. The outwardly angled face 32 of the second axial flange 24 includes an angle $A^2$. In general, the angle $A^2$ includes any suitable angle. More particularly, the angle $A^2$ is about 1° to about 15° to facilitate telescopically sliding the plain end 18 into the axial groove 26. More particularly still, the angle $A^2$ is about 5°.

Also shown in FIG. 4, the first axial flange 22 extends a length $L^1$ past a bottom or proximal portion of the axial groove 26. The length $L^1$ includes any suitable length. In general, the length $L^1$ may vary from about ¼ inch (0.6 cm) to about ½ inch (1.3 cm). The second axial flange 24 extends a length $L^2$ past a distal end of the first axial flange 22. In general, the length $L^2$ is to provide sufficient area to secure the fastener 34. Depending upon the type of fastener utilized, the length $L^2$ may vary from about 1 cm to about 5 cm. In a particular example, the length $L^2$ is about 2.54 cm.

Figure 5:
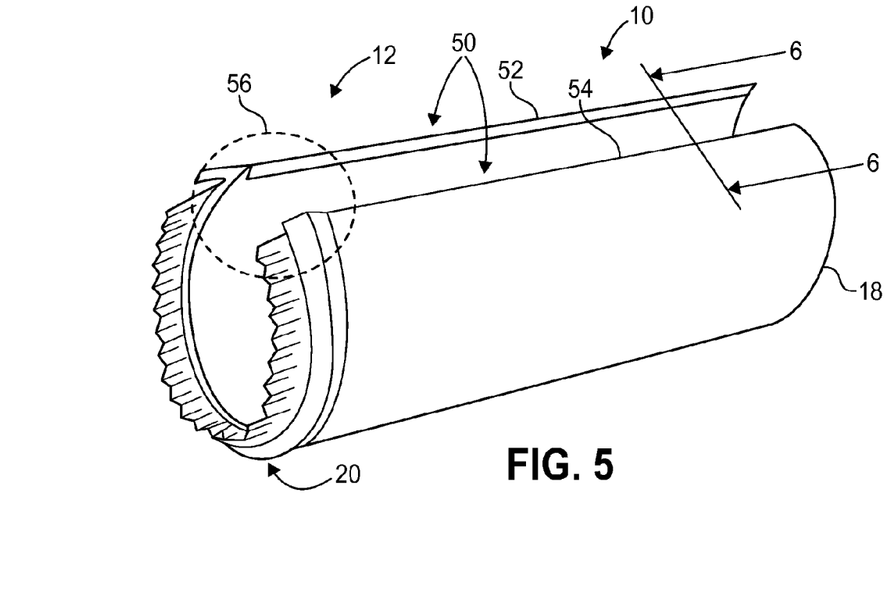
FIG. 5 is an isometric projection of a pipe of FIG. 1.

FIG. 5 is an isometric projection of the pipe 12 of FIG. 1. As shown in FIG. 5, the pipe 12 includes a longitudinal lock 50. The longitudinal lock 50 includes a male portion 52 and female portion 54. Also shown in FIG. 5 is an intersection zone 56 where the receiving end 20 (e.g., the transverse seal) intersects with the longitudinal lock 50. It is at this intersection zone 56 that the pipe and fitting coupling system 10 has the greatest tendency to leak. In order to offset this leakage tendency, additional sealant, such as the sealant 28, may be utilized as described herein.

Figure 6A:
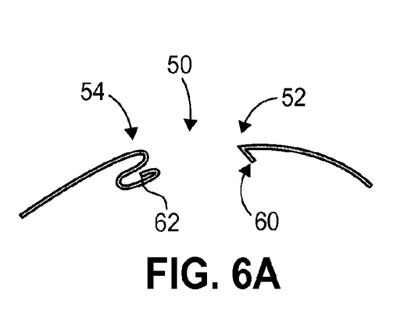
FIG. 6A is a cross-sectional view taken along line 6-6 of FIG. 5.
Figures 6B, 7B, 8:
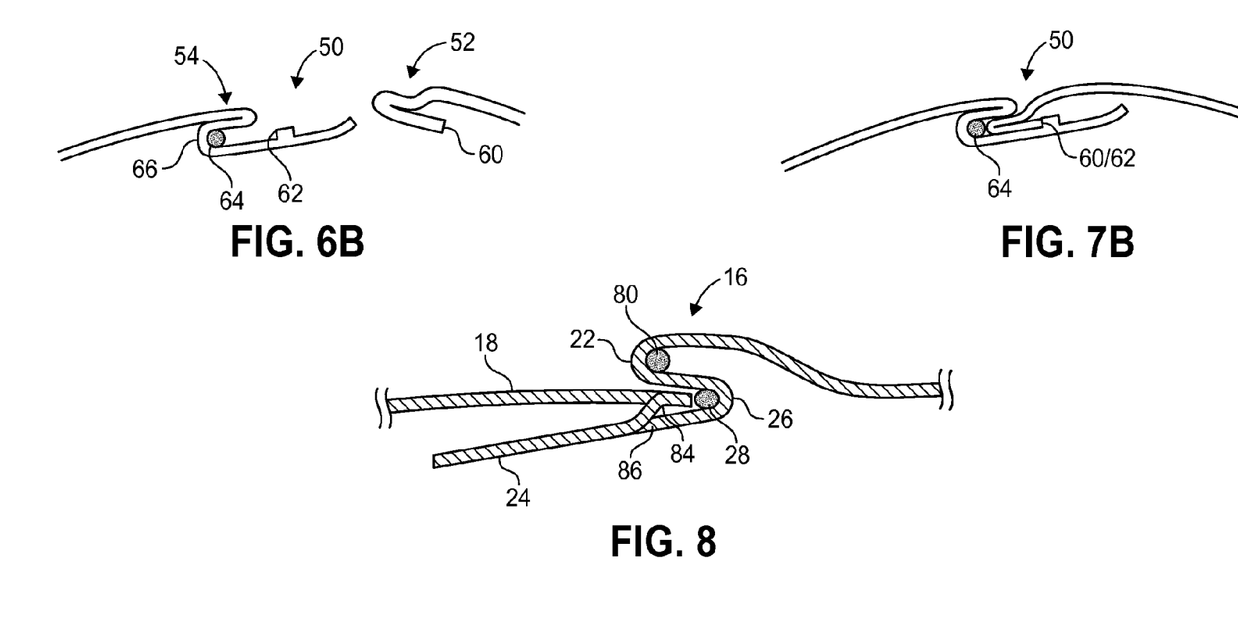
FIG. 6B is a cross-sectional view taken along line 6-6 of FIG. 5 in a locked conformation in accordance with the embodiment of FIG. 6A.
FIG. 7B is a cross-sectional view taken along line 6-6 of FIG. 5 in a locked conformation in accordance with the embodiment of FIG. 7B.
FIG. 8 is a cross-sectional view taken along line 4-4 of FIG. 1 in a locked conformation.

FIG. 6A is a cross-sectional view taken along line 6-6 of FIG. 5 in accordance with an embodiment of the invention. As shown in FIG. 6A, the male portion 52 includes a hem 60 and the female portion 54 includes a locking groove 62. As shown in FIG. 6B, in response to the male portion 52 being inserted sufficiently into the female portion 54, the hem 60 slides past the locking groove 62 and engages the locking groove 62 to secure the male portion 52 in the female portion 54.

Figure 7A:
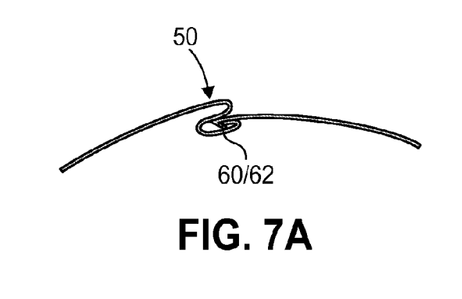
FIG. 7A is a cross-sectional view taken along line 6-6 of FIG. 5.

FIG. 7A is a cross-sectional view taken along line 6-6 of FIG. 5 in accordance with another embodiment of the invention. As shown in FIG. 7A, the male portion 52 includes the hem 60 and the female portion 54 includes the locking groove 62. Alternatively, the longitudinal lock 50 may include a button lock. In addition, the female portion 54 includes a sealant 64 disposed in a channel 66. As shown in FIG. 7B, in response to the male portion 52 being inserted sufficiently into the female portion 54, the male portion 52 is pressed against the sealant 64 to form a seal and the hem 60 slides past the locking groove 62 and engages the locking groove 62 to secure the male portion 52 in the female portion 54.

FIG. 8 is a cross-sectional view taken along line 4-4 of FIG. 1 in a locked conformation in accordance with another embodiment of the invention. As shown in FIG. 8, the pipe and fitting coupling system 10 optionally includes a sealant 80 in a groove corresponding to the back side of the first axial flange 22. If included, the sealant 80 is configured to reduce or eliminate air leakage at the intersection zone 56. That is, by placing in the groove corresponding to the back side of the first axial flange 22, air leakage at the intersection zone 56 has been reduced based upon empirical testing.

Also shown in FIG. 8, the pipe and fitting coupling system 10 optionally includes a lock 82 disposed at the joint 16 configured to secure the plain end 18 in the receiving end 20. In general, the lock 82 includes any suitable locking structure(s) such as tabs, barbs, hems, locking grooves, buttons, dimples, hooks, catches, detents, and the like. In a particular example, the plain end 18 includes a hem 84 and the receiving end 20 includes a locking groove 86. In various examples, the hem 84 and locking groove 86 may be configured to releasably engage or substantially non-releasably engage (that is, the engagement may be sufficiently secure such that uncoupling the joint 16 results in a permanent deformation of at least the hem 84 and locking groove 86). In yet another example, the plain end 18 includes a series of the hems 84 or buttons, dimples, and the like spaced about the circumference and the receiving end includes a series of locking grooves or catches spaced about the circumference. In this manner, the lock 82 may be selectively engaged by rotating the plain end 18 relative to the receiving end 20.

Figure 9:
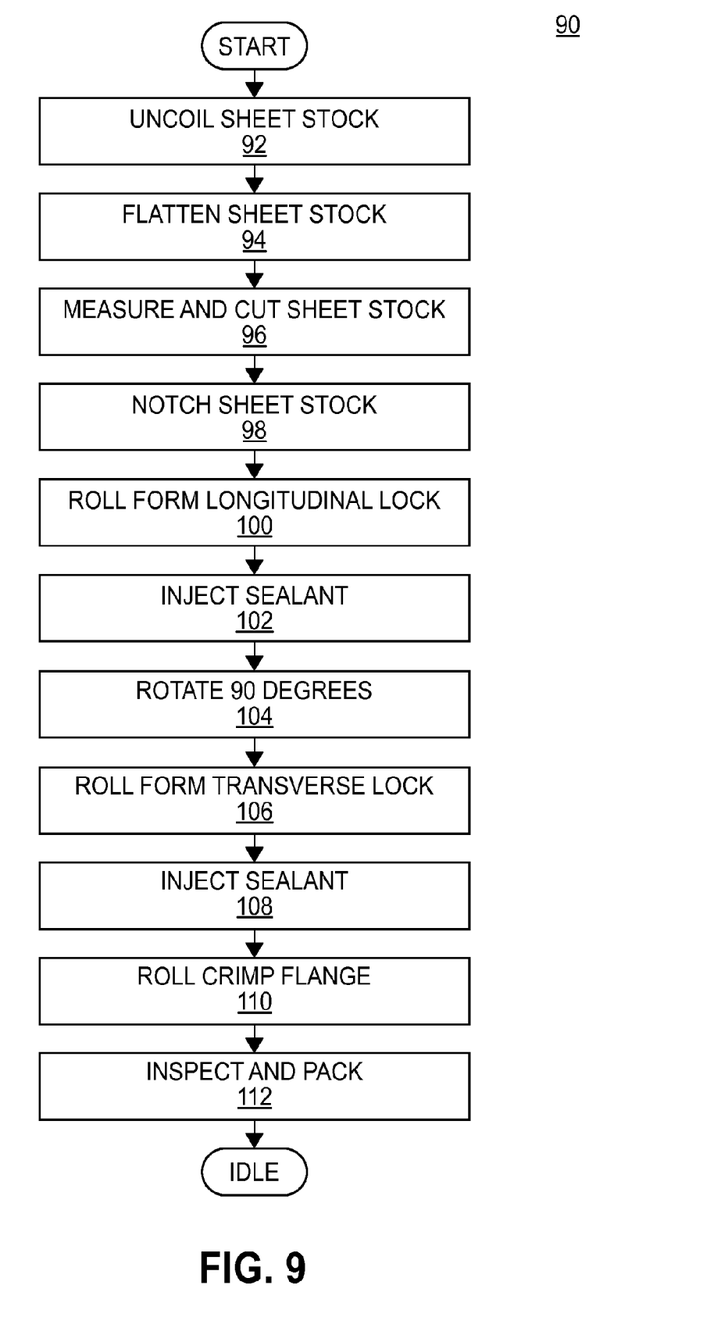
FIG. 9 is a flow diagram of a method of fabricating the pipe and fitting coupling system of FIG. 1.

FIG. 9 is a flow diagram of a method 90 of fabricating the pipe and fitting coupling system of FIG. 1. In general, to fabricate a pipe such as the pipe 12 and 14, a supply of sheet metal is uncoiled with an uncoiler at step 92. The sheet metal is then flattened with a flattener to reduce the coil set, e.g., the tendency of the metal to coil at step 94. At step 96, the sheet metal is measured and cut to the predetermined dimensions by a shear, for example. A notcher removes segments of sheet metal that would otherwise interfere with the longitudinal or transverse locking mechanism at step 98. The notched sheet now travels to a conventional longitudinal lock former via a transfer table. At step 100, the sheet now receives the longitudinal lock 50 such as a "snap" lock shown in FIGS. 6A and 7A or "button" lock mechanism as shown in FIGS. 6B and 7B. One side is roll formed to a female lock, the other side to a male lock. While the locks are being formed, a sealant is injected into the female portion on the lock at step 102. Upon exiting the lock former, the pipe blank travels onto another transfer table that changes the direction of travel by 90 degrees at step 104. At step 106, the pipe blank enters the inventive roll former configured to form the receiving end 20.

In general, structures such as flanges and grooves are formed in sheet stock by passing the stock through a series of rolls or dies. A first roll in the series may initiate a bend and subsequent rolls accentuate the structure. In order to fabricate the receiving end 20, the receiving end 20 is 'flared' or otherwise formed with a die and/or rolls to generate an outwardly angled face 38. In general, the outwardly angled face 38 increases the diameter of the pipe from the diameter D to the diameter $D^1$. Once the outwardly angled face 38 is formed, the first axial flange 22, the axial groove 26 and second axial flange 24 are formed by passing the receiving end 20 through one or a series of rolls or dies. Following step 106, the sealant 28 is injected or otherwise disposed in the axial groove 26 at step 108. The blank then travels to a crimper machine and the series of crimps 36 may be formed in the second axial flange 24 at step 110. Following fabrication, the completed pipe 12 exits onto a run-out table where it is inspected and then packaged at step 112.

Alternatively, the pipe and fitting coupling system may be fabricated via a molding or casting process. For example, as is generally known, a negative mold of the pipe 12 may be generated and a material may be introduced to the mold to form the pipe 12.

Figure 10:
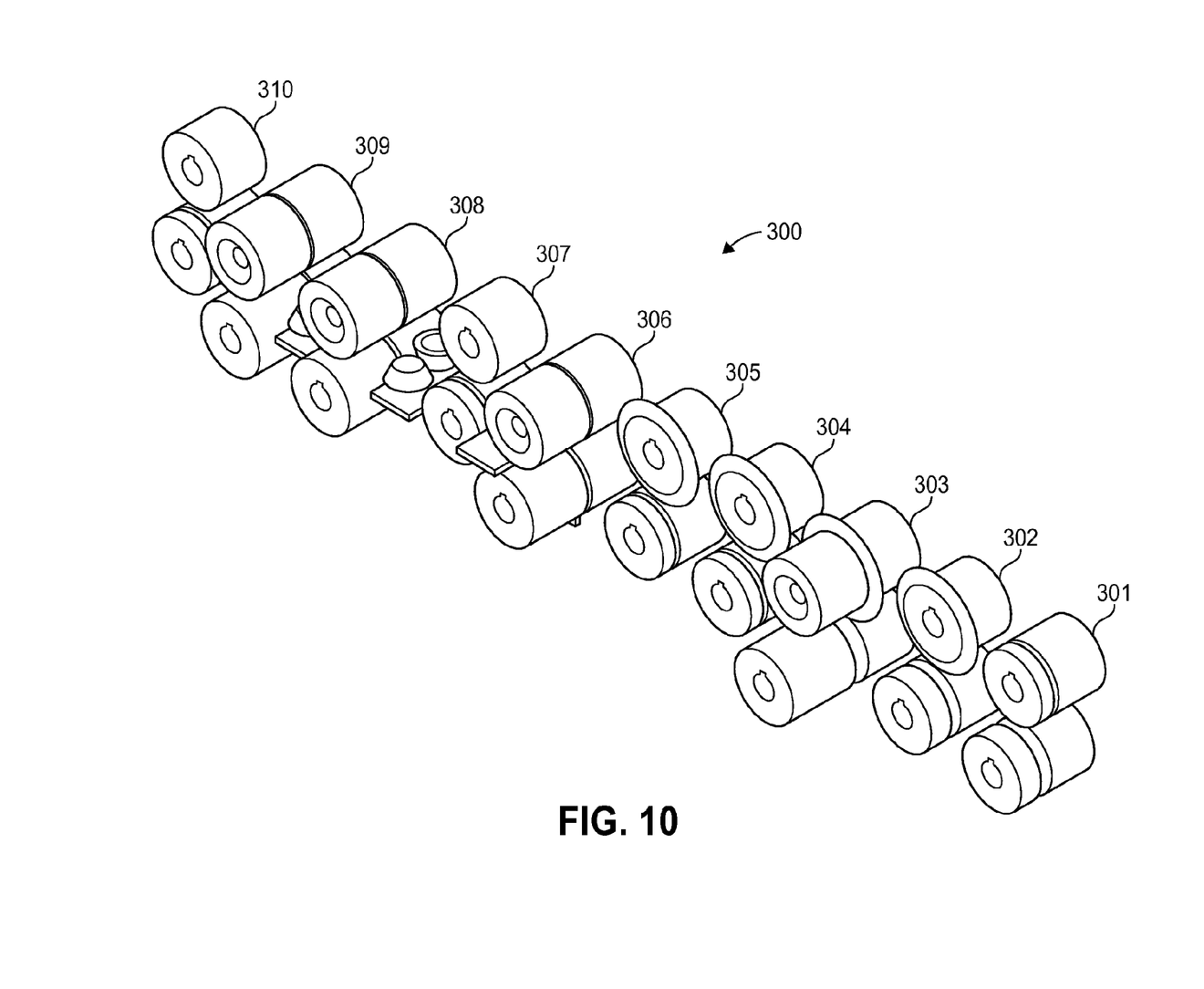
FIG. 10 shows a perspective view of embodiments of a roll forming.
Figure 11:
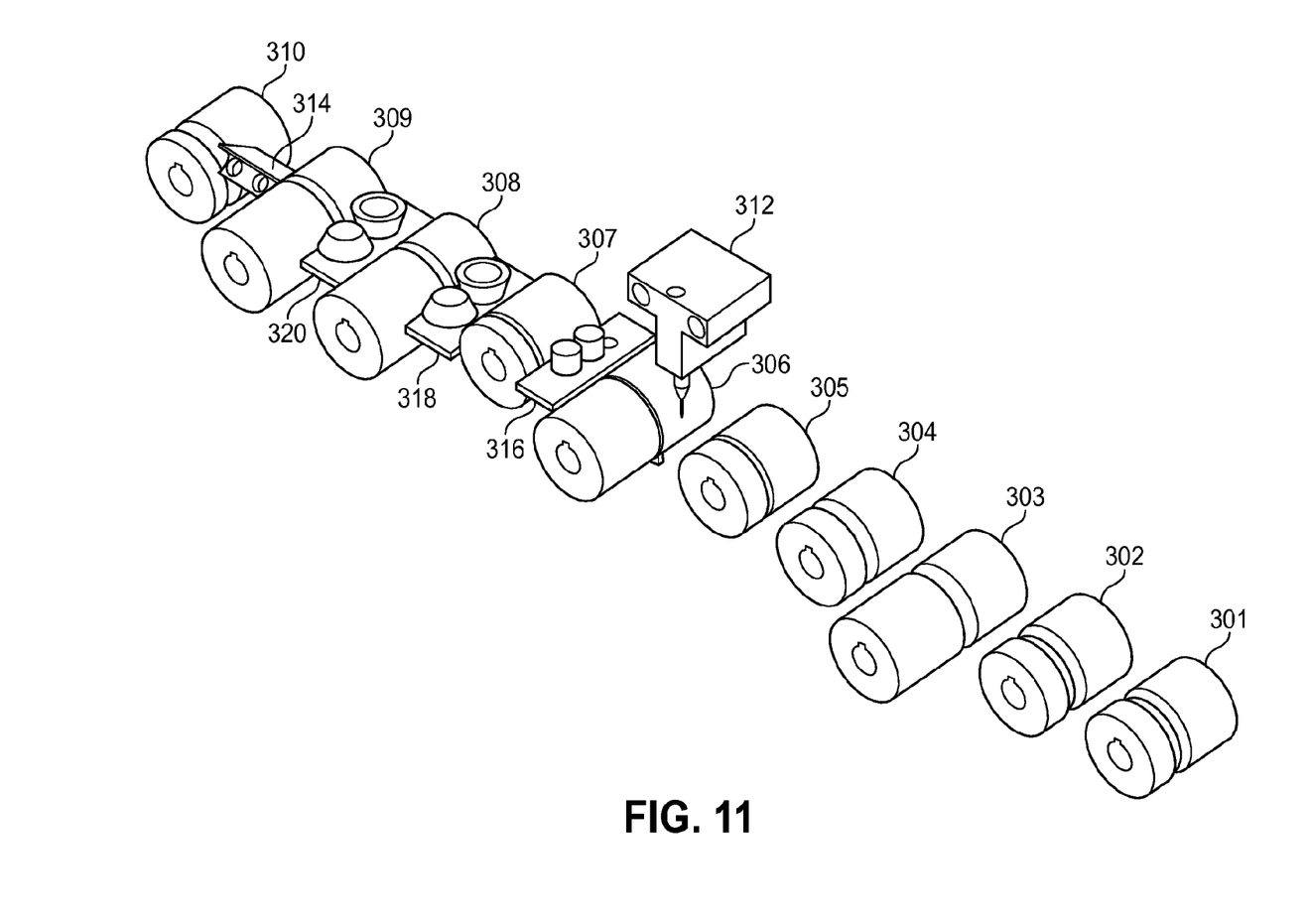
FIG. 11 shows stations of the embodiment of FIG. 10 with top elongated rolls removed.
Figure 12:
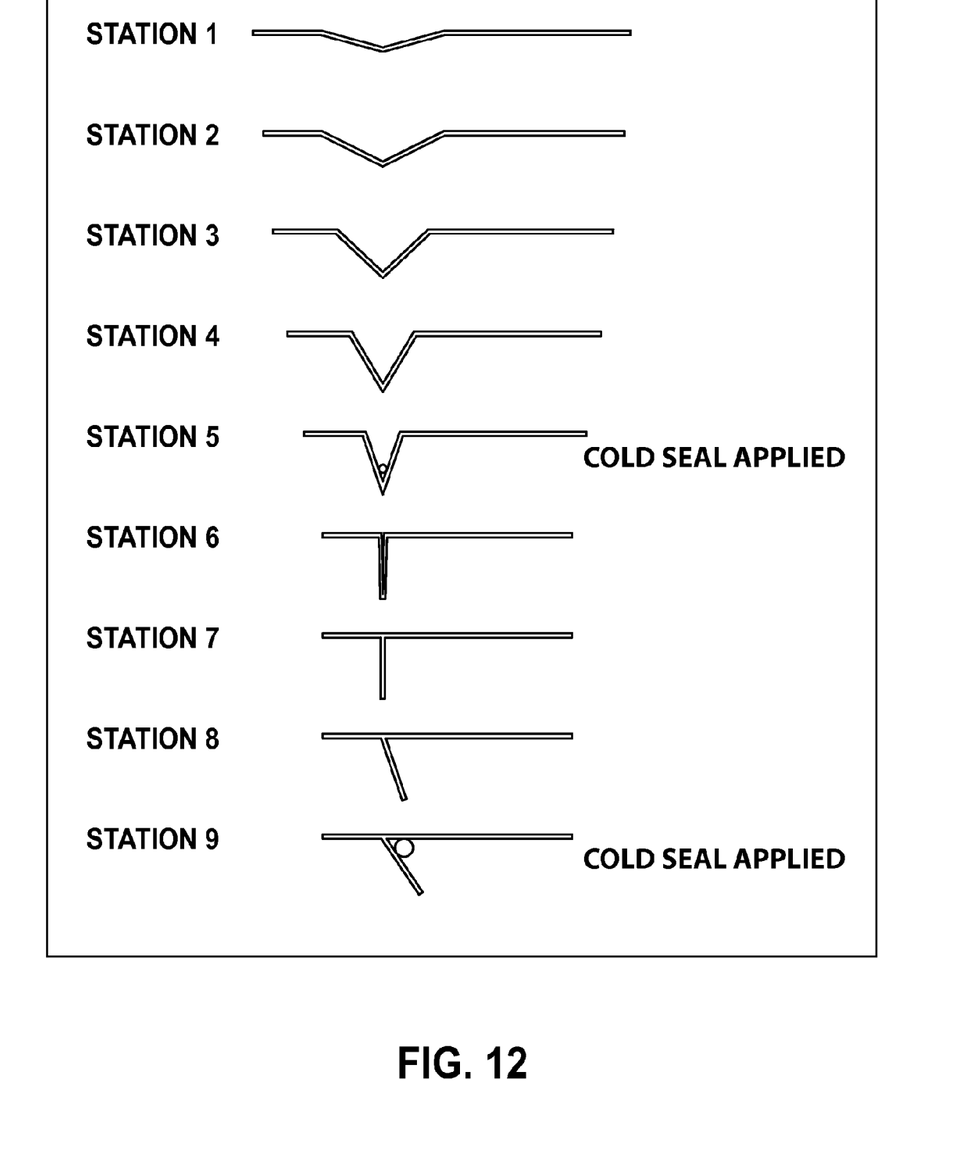
FIG. 12 shows how the pipe ducts is bent at stations 1-9 of FIG. 10.
Figure 13:
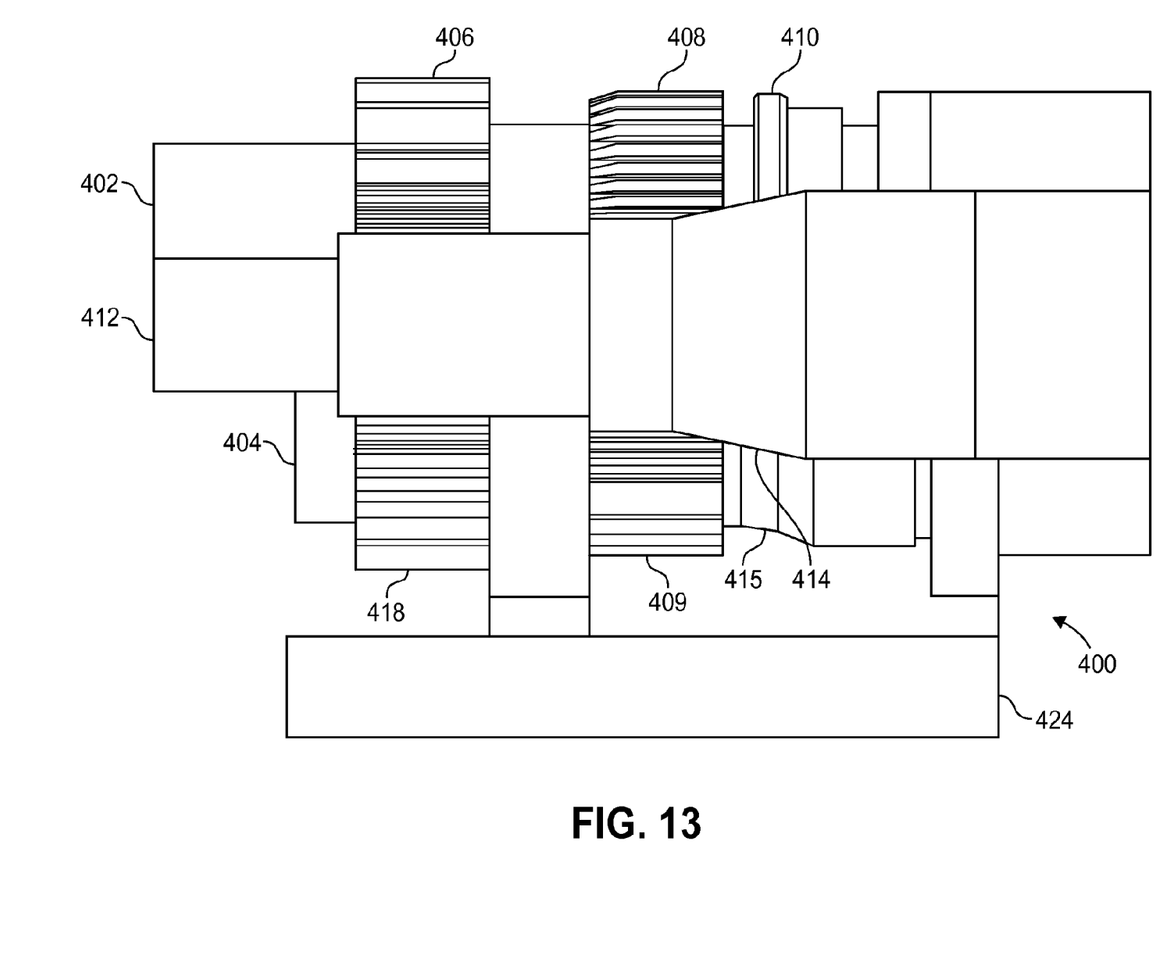
FIG. 13 shows a side view of embodiments of a crimping machine.
Figure 14:
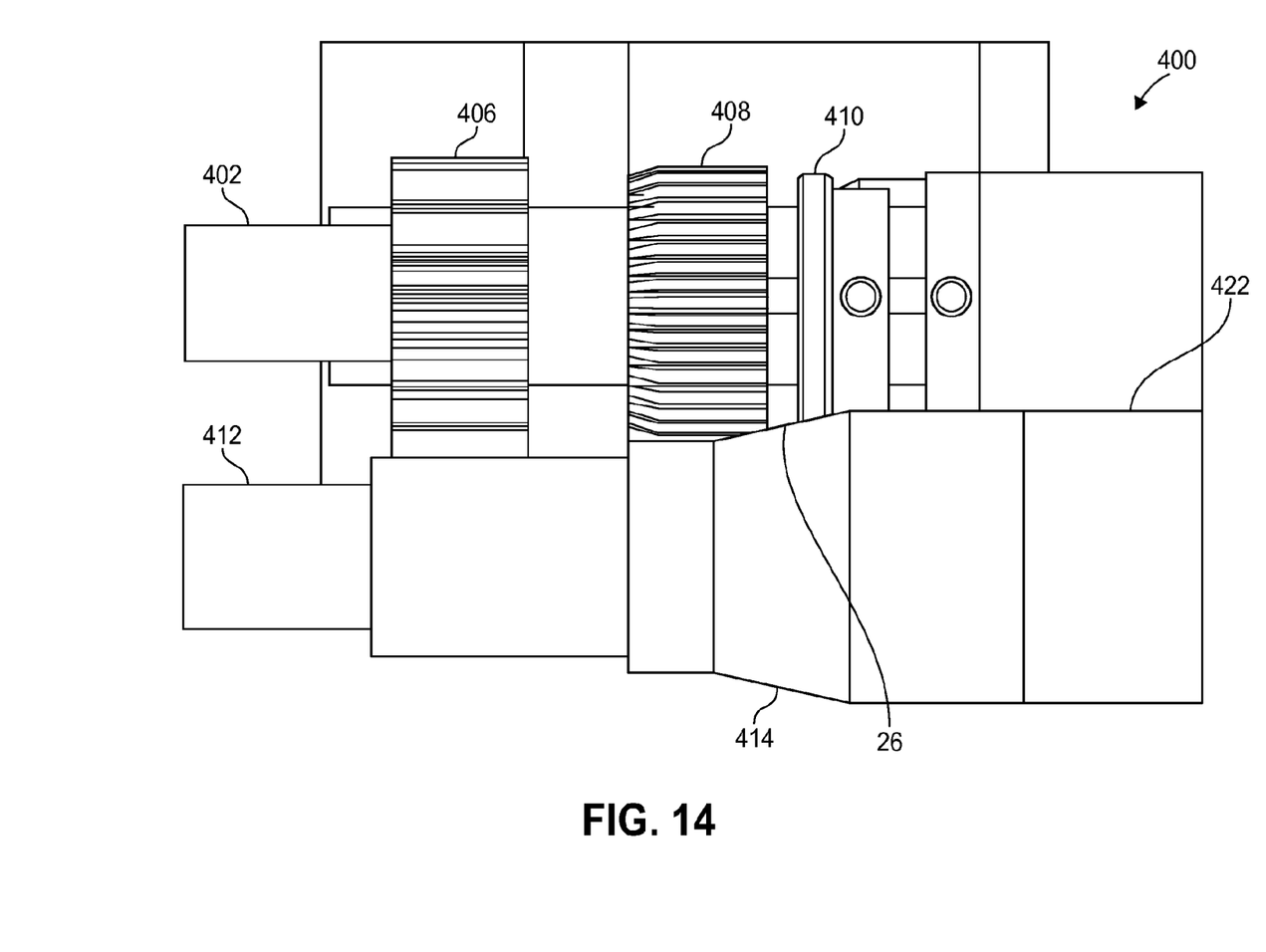
FIG. 14 shows a perspective view of embodiments of a crimping machine with a pipe blank.
Figure 15:
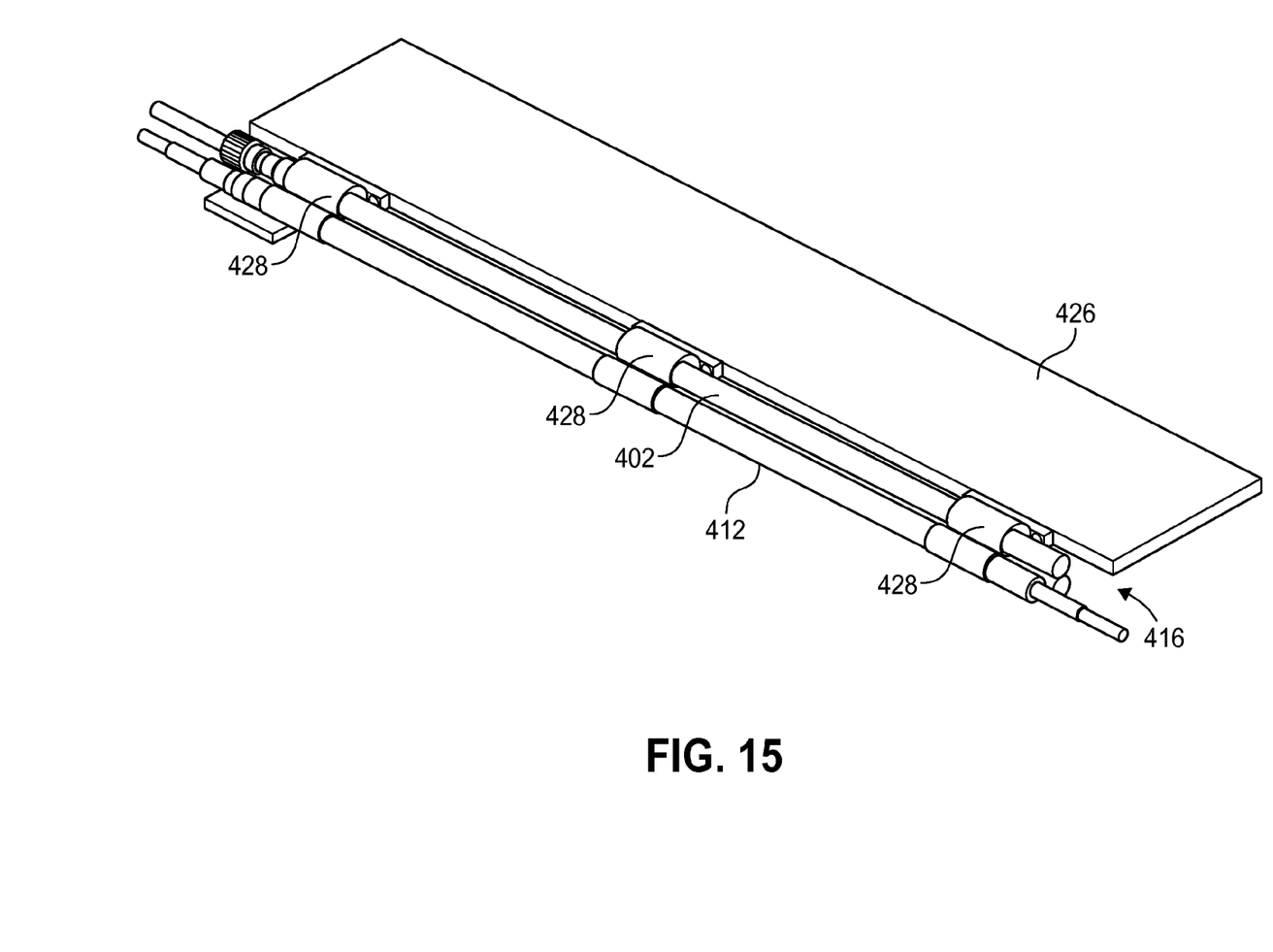
FIG. 15 shows a perspective of embodiments of a crimping machine showing the top roll support.
Figure 16:
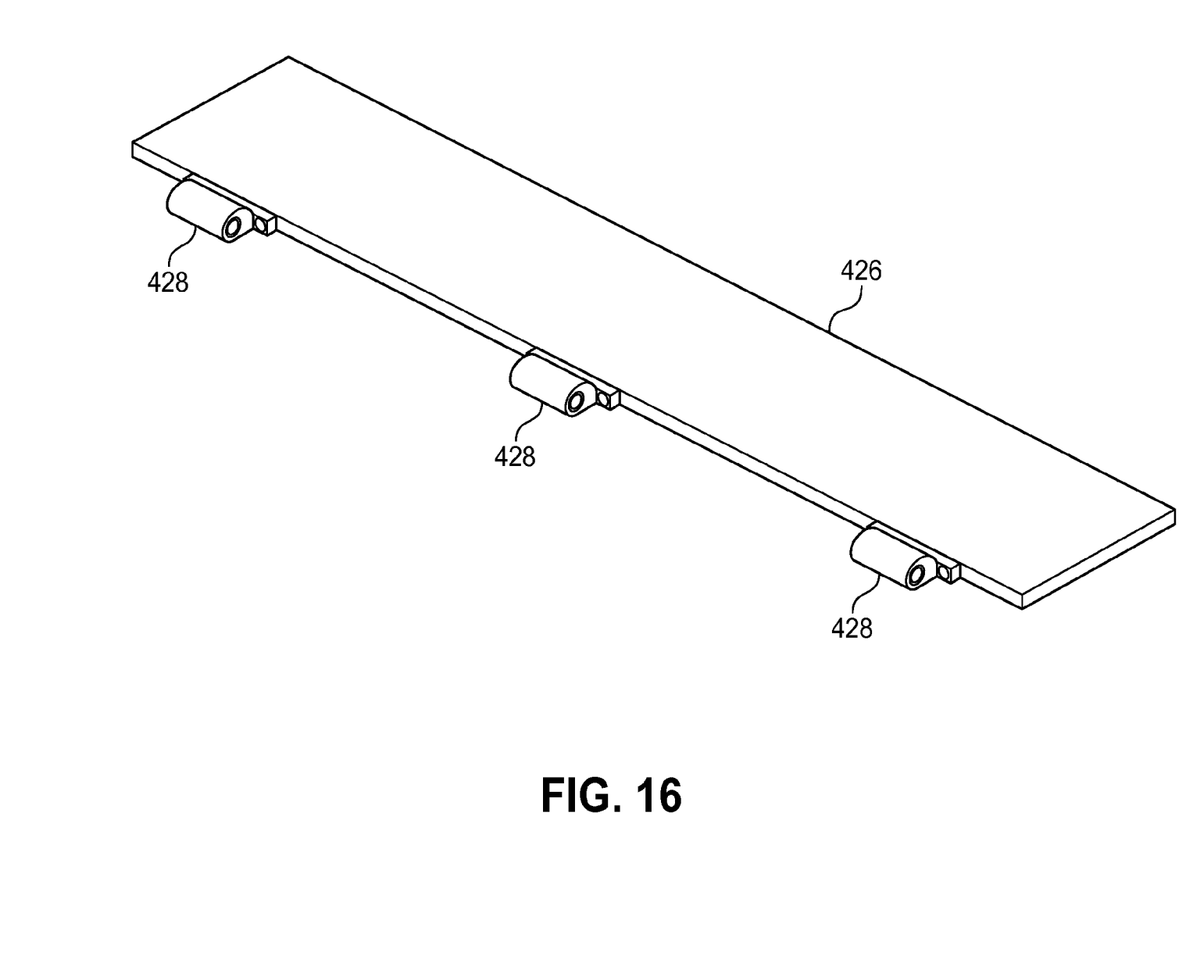
FIG. 16 shows a perspective of embodiments of a crimping machine showing the top roll support with shafts removed.
Figure 17:
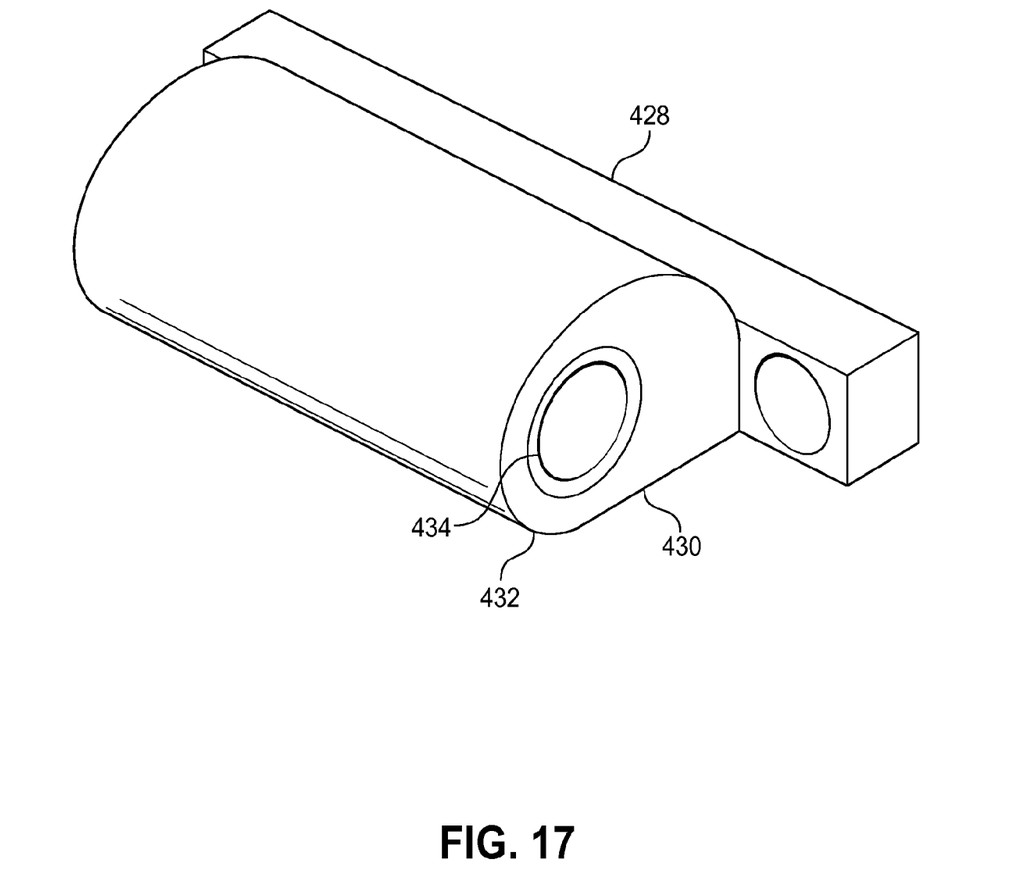
FIG. 17 shows a perspective of the shaft support of a top roll support member.

Embodiments of a roll forming machine 300 used to form the receiving end 20 of pipe 12 are illustrated in FIGS. 10-11. The roll forming machine 300 preferably has nine stations (301 to 310) for forming the receiving end 20 on the pipe blank. Each of stations 1-9 have a top roll and a bottom roll which both move the pipe blank forward while at the same time bending the pipe blank to form the receiving end 20 of pipe 12 as described above. Stations 1 (301) to 6 (306) form the pipe blank into a standing seam, stations 8 (308) and 9 (309) angle the seam to a specific angle depending on the gauge of the material so it will bend to form a pocket when rolled in a later process. The bend of the pipe blank at each station is shown in FIG. 14. FIGS. 15A to 40C show the top and bottom (front and rear) rolls of stations 1 to 9. As discussed above, a sealant injection nozzles 312, 314 are located between stations 5 (305) and 6 (306) and after station 9 (309) to inject sealant as described above. Sealant injection nozzle 312 injects sealant 80 in a groove corresponding to the back side of the first axial flange 22 of receiving end 20, while sealant injection nozzle 314 injects sealant 28 in the axial groove 26.

The roll forming machine 300 preferably has elongated top and bottom rolls at stations 5 (305), 7 (307) and 8 (308). The elongated top and bottom rolls allow the single headed roll former to clinch the pipe blank during the forming process. To accomplish this task, the bottom rolls at stations 5 (305), 7 (307) and 8 (308) are attached to a longer shaft driving the bottom rolls. The top rolls are mounted on a separate shaft that is allowed to pivot with the help of an air cylinder (not shown). When the beginning or the end of a pipe blank approaches, sensors actuate the cylinders causing the top rolls to temporarily lift up to allow the male or female longitudinal lock to pass. Once past, the air cylinder releases the roll and again clinches the pipe blank to prevent it from shifting during the forming process. This added pressure on the pipe blank helps keep the material to stay straight in the rolls and therefore produces a much more consistent lock.

The roll forming machine 300 preferably includes three sets of horizontal rolls (vertical axis) located between stations 6 (306) and 7 (307), stations 7 (307) and 8 (308), and stations 8 (308) and 9 (309). The primary purpose of these rolls is to guide the pipe blank as it is being formed in the roll forming machine 300. A first set 316 of horizontal rolls between station 6 (306) and 7 (307) guides the standing flange (first axial flange 22) into the next set of rolls that pinch it shut. The second set 318 of horizontal rolls stations between 7 (307) and 8 (308) as well as the third set 320 between stations 8 (308) and 9 (309) hold the flange at the desired angle and prevent the flange to move out of position, creating an uneven lock.

After the pipe blank leaves the roll forming machine of FIGS. 10-11, it enters a crimping machine 400 illustrated in FIGS. 13-17. The pipe blank 422 enters the crimping machine 400 with the transverse lock channel (having flange 22, FIG. 2) at an angle, for example, of 30 degrees. The crimping machine 400 has a series of shafts which grab the pipe blank 422, crimp it and roll it forward into the desired diameter of the pipe. The shafts are rotatably connected to a crimping machine frame 424. The crimping machine 400 includes an upper shaft 402 and a lower shaft 404 and a forming shaft 412. The upper shaft 402 includes a drive gear 406, crimp gear 408 which creates a shortened crimp on the male end of the pipe, and a bead wheel 410. Lower shaft 404 includes a drive gear 418, crimp gear 409 and a tapered portion 415 disposed opposite the bead wheel 410. Compared to a standard roller, crimp gears 408, 409 are substantially shorter. Also bead wheel 410 has a greater diameter than standard bead wheels. The upper shaft 402 and lower shaft 404 grab the pipe blank 422 and move it forward, crimping the blank and applying pressure on the transverse lock groove or channel 26 with the bead wheel 410. Bead wheel 410 pushes against a tapered portion 414 of forming shaft 412 and the tapered portion 415 of lower shaft 404 in order to complete bending of the channel from its original first angle, for example, 30 degrees to a second angle (station 9, FIG. 12), for example, 90 degrees in the finished product. The forming shaft 412 rolls the pipe blank 422 into the desired diameter of the pipe. The bead wheel 410 pushes the base of the channel (FIG. 14) to force the channel against the tapered shaft, creating the desired angle.

A top roll support 416 is configured to allow larger diameter pipe room to expand around the forming shaft 412 without encountering resistance from the top roll support 416. In a traditional arrangement, the top roll support is typically spaced 6 inches back from the upper shaft and typically extends 8 inches above the upper shaft. If a traditional arrangements were used to roll the pipe described above with reference to FIGS. 1-9, since the transverse channel formed gives the pipe a lot more rigidity, when larger diameter pipe is rolled, the lead edge of the pipe and the pipe body itself would hit a traditional top roll support, putting unwanted pressure on the material as it exists the roller/crimper because the typical roll support hung over and was too close to allow the large diameter pipe to form without contacting. This resistance during the traditional rolling process would result in a flat spot in the pipe. The top roll support 416, according to the illustrated embodiment, includes a flat support member 426 that eliminates the traditional large support. Flat support member 426 is preferably composed of metal, for example, steel. Top roll support 416 further includes at least one bearing support member 428. In the illustrated embodiment, there are three bearing support members 428. Each bearing support member 428 includes a first portion 430 which supports a bearing 432 that rotatably supports upper shaft 402. Each bearing support member 428 further includes a second portion 434 which holds the bearing 432 in the first portion 430. Due to the configuration of the top roll support 416, the pipe blank 422 does not encounter the traditional reinforced backstop and therefore rolls into larger diameter pipe without being constricted or hindered. This allows pipe of the type described above with reference to FIGS. 1-9 to be rolled in a round shape without flat spots.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A crimping machine comprising:
   a first rotatable shaft including first crimping portion and a bead wheel;
   a second rotatable shaft including a second crimping portion and a tapered portion disposed opposite the bead wheel of the first shaft, wherein the first and second shafts are configured to grip a pipe blank having a transverse channel including a first angle, and wherein the first and second shafts are configured to roll the pipe blank forward while crimping a portion of the pipe blank with the first and second crimping portions and applying pressure on the transverse channel of the pipe blank; and
   a rotatable forming shaft having a tapered portion disposed opposite at least a portion of the crimping portion and the bead wheel of the first shaft, wherein the bead wheel is configured to push upon the forming shaft to bend the first angle of the transverse channel formed in the pipe blank to a second angle.

2. The crimping machine of claim 1, further comprising a roll support rotatably supporting the first shaft and configured to allow a pipe blank having a transverse channel to be formed into a round shape without interference.

3. The crimping machine of claim 2, wherein the roll support comprises a flat support member configured such that it does not interfere with a pipe blank forming into a pipe around the forming shaft.

4. The crimping machine of claim 3, wherein the roll support further comprises at least one bearing support member having at least one bearing rotatably supporting the first shaft.

5. The crimping machine of claim 1, wherein first shaft and the second shaft each have gears operatively connected to one another.

* * * * *